US 6,738,648 B1

(12) United States Patent
Delacourte

(10) Patent No.: US 6,738,648 B1
(45) Date of Patent: May 18, 2004

(54) MOBILE TELEPHONE COMPRISING A DETACHABLE CONNECTOR BETWEEN ITS BODY AND ITS BATTERY PACK

(75) Inventor: Bruno Delacourte, L'Isle Adam (FR)

(73) Assignee: Sagem, S A, Paris (FR)

( * ) Notice: Subject to any disclaimer, the term of this patent is extended or adjusted under 35 U.S.C. 154(b) by 307 days.

(21) Appl. No.: 09/699,291

(22) Filed: Oct. 27, 2000

(30) Foreign Application Priority Data

Oct. 27, 1999 (FR) .......................................... 99 13443

(51) Int. Cl.⁷ ................................................ H04B 1/38
(52) U.S. Cl. .................... 455/572; 455/446; 455/556.1; 455/556.2; 379/433.05; 379/433.08; 379/438
(58) Field of Search ...................... 379/433.05, 433.08, 379/438; 455/556.1, 556.2, 466, 572

(56) References Cited

U.S. PATENT DOCUMENTS

| 5,066,235 A | 11/1991 | Kobayshi .................... 439/824 |
| 5,389,885 A | 2/1995 | Swart | |
| 5,749,754 A | 5/1998 | Patterson et al. .......... 439/76.1 |
| 6,275,390 B1 * | 8/2001 | Wu et al. ................... 361/818 |

FOREIGN PATENT DOCUMENTS

| DE | 4401469 A1 | 7/1994 |
| WO | WO 96/24197 * | 8/1996 |

* cited by examiner

*Primary Examiner*—Sinh Tran
*Assistant Examiner*—David Nguyen
(74) *Attorney, Agent, or Firm*—Boyle, Fredrickson, Newholm, Stein & Gratz, S.C.

(57) ABSTRACT

The mobile telephones comprise two main elements, namely a body (101) and a battery (103) the powers this body. The users of the mobile telephones may wish, through their mobile telephone, to have functions other than that of communicating with another person. These other functions (107–109) are then incorporated into the battery and a functional connector (120) is placed between the body and the battery. In order to keep a body that is as standard as possible, the functional connector is made detachable. The functional connector then sets up a connection between the contacts (116) of the body and contacts (111) of the battery. Thus the body is the same whatever the type of battery. Similarly, the cost of the telephone is henceforth bone only by those who have need of it.

17 Claims, 1 Drawing Sheet

MOBILE TELEPHONE COMPRISING A DETACHABLE CONNECTOR BETWEEN ITS BODY AND ITS BATTERY PACK

BACKGROUND OF THE INVENTION

1. Field of the Invention

An object of the invention is a mobile telephone comprising a detachable connector located between its body and its battery pack. The field of the invention is mobile telephony. However, this field can be extended to all fields that implement modular electronic devices. Indeed, depending on the electronic modules selected for an application, a connection may or may not be needed between these selected modules. It is therefore worthwhile that the connector should be detachable.

The aim of the invention is to reduce the cost of the body of a mobile telephone. Indeed, at the present time, increasing numbers of functions are being incorporated into battery packs. It is therefore necessary to set up a functional connection between the battery pack and the body of the mobile telephone to which the pack will be fixed. This link is set up through a connector of the body and contacts of the pack.

2. Description of the Prior Art

In the prior art, there are known mobile telephones comprising battery packs provided with different functions, such as a chip-card reader for example. The functional link between the body of the mobile telephone and the chip-card reader is then set up by means of a connector of the body. The connector of the body, which is constituted by retractable pins for example, presses on the contacts of the battery pack. A connection is then set up satisfactorily because the contacts of the battery press on the pins of the body.

However, this approach is not entirely satisfactory since the cost of fitting in the connector has to be borne by all the users of the body, including those using a battery whose sole function is to supply power to the body.

Indeed, in the prior art, the connector of the body is integrated fixedly, at the outset by the use, in the body, of the parts forming the connector. Since the aim is to achieve an economy of scale, it is useful to have the same mold whatever the options and functions of the telephone to be produced. This is why it is no longer judicious to incorporate a connector on the battery side and contacts on the telephone. Indeed, this method would result in identical mobile telephone bodies, but the connector placed on the battery pack would not be needed every time and would therefore entail excess cost for certain models.

The invention resolves these problems by using a detachable connector placed between the body of the mobile telephone and the battery pack. The connector is then put into place only when needed, namely when a battery comprising ancillary functions is connected to the body of the telephone. The detachable connector is then fixed either to the body of the telephone or to the battery. In a preferred embodiment, it is fixed to the body of the mobile telephone. Thus, whatever the body of the mobile telephone and the battery coupled to it, the physical interface between the body and the battery pack will be identical. The battery pack has contacts designed for the setting up of a connection with the detachable connector, and the body of the telephone has a receptacle for the detachable connector.

SUMMARY OF THE INVENTION

An object of the invention therefore is a mobile telephone comprising a body of the mobile telephone and a battery pack, wherein the mobile telephone comprises a detachable connector that conducts a signal between contacts located, firstly, on the body of the mobile telephone and, secondly, on the battery pack.

BRIEF DESCRIPTION OF THE DRAWINGS

The invention will be understood more clearly from the following description and the appended figures. These figures are given purely by way of an indication and in no way restrict the scope of the invention. Of these figures.

MORE DETAILED DESCRIPTION

Figure 1:
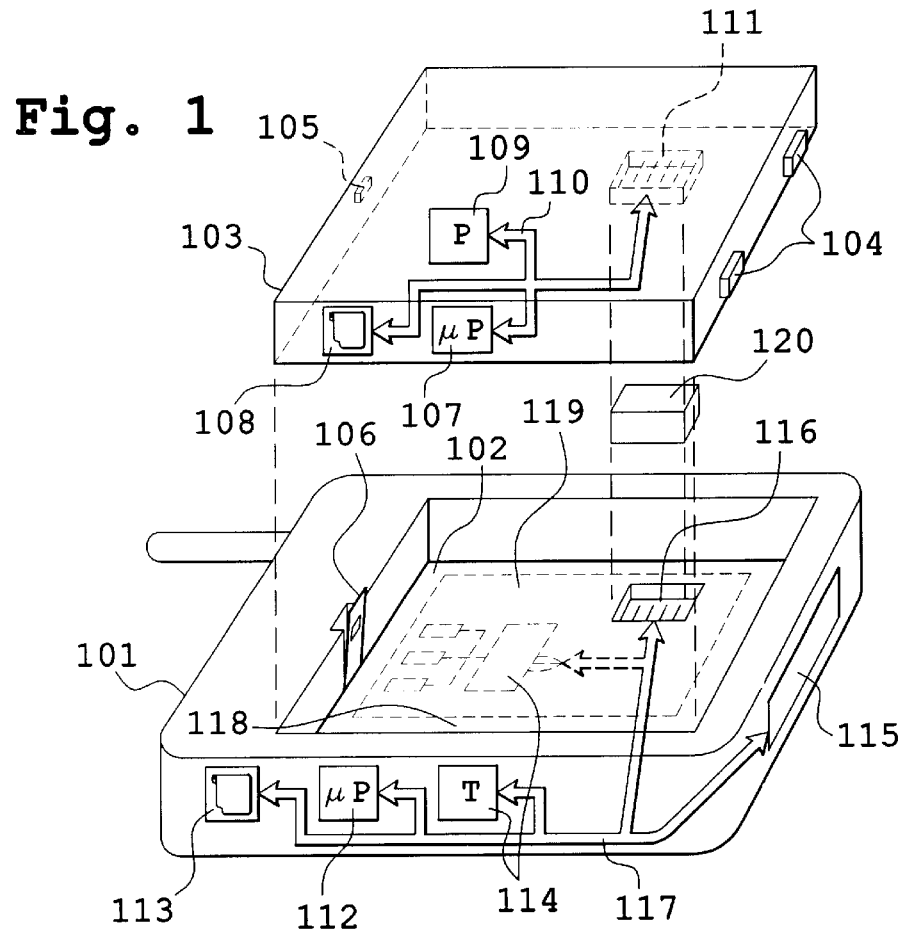
FIG. 1 illustrates a mobile telephone body and a battery pack according to the invention.

FIG. 1 shows a mobile telephone 101 comprising a cavity 2 designed to receive a battery pack 103. In order that it can be fixed to the telephone 101, the pack 103 has snugs 104 and a slot 105. In general, the or tabs are located at the bottom of the pack and the slot on the top of the pack. It is understood that the "top" is understood to mean the side on which the loudspeaker of the telephone 101 is located and the "bottom" is the side on which the microphone is located. The battery 103 is thus oriented with respect to the telephone 101. Then the snugs are introduced into the slots of the telephone 101 which are not shown in FIG. 1 and then the battery 103 is tilted into the cavity 102. The upper edge of the cavity 102 has a clip 106.

The clip is an elastic member, namely for example a strip mounted in an elastic way and comprising a snug designed to be introduced into a slot. In its resting position, the snug of the clip is introduced into the slot. When the clip is shifted, this has the effect of releasing each snug from its slot and therefore making the battery 103 detachable.

The battery 103 has also a microprocessor 107, a memory 108 and a peripheral circuit 109. The elements 107 to 109 are connected by a bus 110. The bus 110 is furthermore connected to contacts 111. In practice, the battery 103 does not necessarily have any microprocessor 107, memory 108 or peripheral circuit 109. There have been cited and shown as examples. What has to be done is to show that the battery 103 has electronic circuits fulfilling a function and capable of being interconnected by means of the contacts 111 with another electronic device, a mobile telephone body for example. The circuit 109 may for example be a chip-card reader, an organizer or a communications module. The memory 108 contains instruction codes that control the microprocessor 107 to make it exploit the circuit 109. The contacts 111 enable the microprocessor 107 to communicate with the telephone body 101.

The body 101 has a microprocessor 112, a memory 113, and circuits 114 for its activity of mobile telephony. To be able to communicate with different peripherals, the telephone 101 also has a service port 115, used to connect the telephone to external peripheral machines, and a port 116. The port 116 is located inside the cavity 102. It is through the port 116 that the telephone 101 can get connected to the peripheral in the battery 103. The elements 112 to 116 are connected together by means of a bus 117. The bus has all the wires or tracks needed to propagate the signals needed for the efficient operation of the different elements in the telephone. This means that it comprises wires designed to convey address, control and data signals. In practice, it may happen that the ports 115 and 116 are not directly accessible through the bus, but through an electronic interface. These interfaces are neither shown nor described because they exist and are used commonly.

The cavity 102 has a cover 118 designed to protect and isolate a printed circuit 119. It is on this printed circuit that the different components fulfilling the telephony function of the body 101 are laid out. The port 116 has metallized contacts which are also on this printed circuit 119. The cover 118 therefore has a cavity for accessing the contact of the port 116. This cavity is not a simple aperture in the cover 118. This cavity indeed has walls that go from the cover 118 to the printed circuit 119. In practice, the components 114 may be radiating, namely they may emit electromagnetic waves whose propagation must be prevented so that they do not disturb the different electronic machines existing around the body 101. This is why the cover 118 may shield the printed circuit 119. In this case, the cavity in the cover 118 does not constitute a break in the electromagnetic protection. Indeed, the contacts of the port 116 do not convey high frequency radio signals. The contacts therefore are not radiating and the fact that they are in the open entails no risk of disturbing the operation of the electronic machines surrounding the body 101.

FIG. 1 also shows a detachable connector 120. The connector 120 is inserted into the cavity of the port 116 and is then held in position by means of the port. Once in position, the connector 120 provides continuity between the contacts of the port 116 and the contacts 111 of the battery 103. Once in position, the connector 120 is held but it may be removed. It can therefore be planned to slide several types of detachable connectors 120 depending on need or on the type of connector 111 existing on the battery 103.

Figure 2:
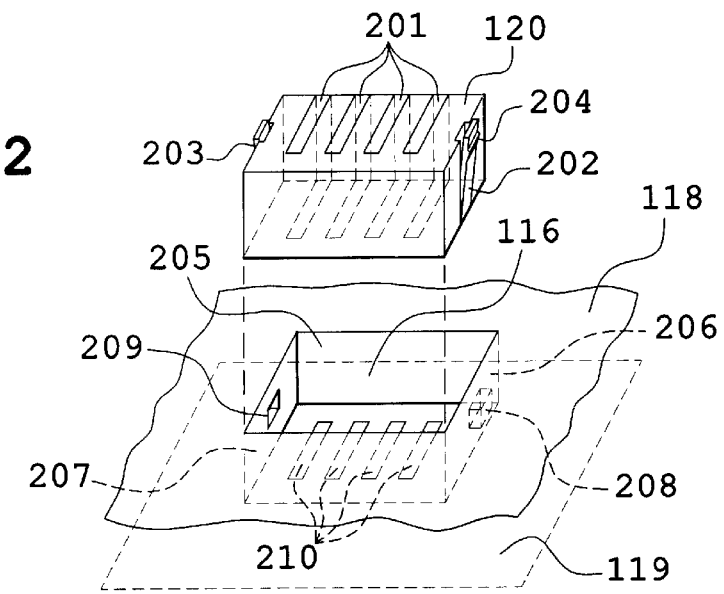
FIG. 2 provides a detailed illustration of a connector according to the invention and its receptacle on the body of the telephone.

FIG. 2 gives a detailed view of the connector 120 and the port 116. In the example shown, the connector 120 has strips 201 that transmit signals between the contacts of the port 116 and the contact 111. The strips 201 are each constituted by three segments. The lower part of the connector 120 is considered to be the one located closest to the circuit 119 once the connector 120 is in position. A strip 201 is fixed to the connector 120 by side edges of the connector. This strip part in contact with the connector is a segment of this strip. It is the central segment. The ends of the strip are then folded on either side of the connector but keep a certain distance from the connector, and have a degree of elasticity. These strips are made out of an elastic metal. Thus, there is a spring effect at the end of the strips. The connector 120 also has clips 202 and 203. The clips 202 and 203 are located on the side edges, preferably opposite the connector. The clips 202 and 203 comprise snugs. The snug of the clip 202 is shown in FIG. 2. It is the snug 204. The clip 202 is fixed elastically to the connector 120. In its idle or disengaged position, one of the ends of the clip 202, the lower end, is fixed to the connector 120. Again in the idle position, the far end of the clip 202 is at a distance from the connector 120. The upper end of the clip 202 may be brought close to the connector 120. However, the elasticity of the clip 202 brings it to its idle position as soon as no stress is applied to it.

The mode of holding the detachable connector by clips as described is an example. In practice, there is another embodiment of a holding device of the detachable connector. For example, circular bumps in the detachable connector may be adapted to dips of the same shape in the body.

FIG. 2 thus shows the port 116. The port 116 consists of a cavity 205 made in the cap 118. The cavity 205 has walls 206 and 207. The walls 206 and 207 have slots 208 and 209 designed to receive the snugs of the clips 202 and 203 respectively. At the bottom of the cavity 205, there are the contacts 210 of the port 116. These contacts 210 are connected to the microprocessor 112 through the bus 117 and possibly an interface. When the connector 120 is inserted into the cavity 205, and when it is pressed in order to be pushed into the bottom, the snugs of the clips 202 and 203 get plugged into the slots 208 and 209. The ends of the strips 201 are then in contact with the contacts 210. If the connector 120 has to be removed, it is then enough to tighten the clips 204 and 203. The elasticity of the strips 201 then pushes the connector 120 upwards. The other end of the strips 201 makes contact with the contacts 111 of the battery 103 when this battery is in position.

In one variant of the invention, the clips could have been positioned on the walls of the cavity 205 and the slots on the edges of the connector 120. This in no way changes the main characteristics of the connector 120 which are that it makes a connection between the telephone 101 and the peripherals located in the battery 103 and that it is detachable.

Similarly, in another variant, the detachable connector could have been placed on the battery 103.

What is claimed is:

1. A mobile telephone comprising a body of the mobile telephone and a pack wherein the mobile telephone comprises, between the body and the pack, a detachable connector that conducts a functional signal between contacts located, firstly, on a printed circuit of the body of the mobile telephone, the printed circuit is protected by a cover the cover framing the contact zone without covering it, the cover therefore comprising a dip that reaches the level of the printed circuit about the contact zone and, secondly, on the pack.

2. A telephone according to claim 1, wherein the body has means to keep the connector detachable.

3. A telephone according to claim 1, wherein the detachable connector comprises clips that get inserted into the slots of the cover of the printed circuit of the body.

4. A telephone according to claim 3, wherein the cover is a shielding.

5. A telephone according to claim 4, wherein the pack comprises means to keep the connector detachable.

6. A telephone according to claim 5, wherein the pack further comprises a battery.

7. A handheld electronic device having a front surface, a back surface, and a side surface comprising:

a pack that engages the electronic device, the pack having a front surface, a back surface, and a side surface;

a first plurality of electrical contacts carried by one of the surfaces of one of the device and the pack;

a second plurality of electrical contacts carried by the other one of the device and the pack; and a connector disposed between the device and the pack, the connector in electrical contact with contacts of the first plurality of electrical contacts and contacts of the second plurality of electrical contacts, the connector comprises a plurality of spaced apart electrically conductive strips that each contact one of the contacts of the first plurality of electrical contacts and that each also contact one of the contacts of the second plurality of electrical contacts when the connector is disposed between the device and the pack and the pack is engaged with the device; and a first digital bus on the device that is connected to one of the first and second plurality of electrical contacts and a second digital bus on the pack that is connected to the other one of the first and second plurality of electrical contacts, the strips of the connector conduct digital electronic signals from the first digital bus to the second digital bus during operation of the device.

8. The handheld electronic device according to claim 7 wherein the first plurality of electrical contacts is disposed in a pocket in the one of the surfaces of the one of the device and the pack and the connector is releasably retained in the pocket.

9. The handheld electronic device according to claim 8 wherein the pocket is defined by a sidewall, one of the connector and the pocket sidewall have a detent, and the other one of the connector and the pocket sidewall have a notch for receiving the detent to releasably retain the connector in the pocket.

10. The handheld electronic device according to claim 9 wherein one of the connector and the pocket sidewall have a plurality of the detents and the other one of the connector and the pocket sidewall have a plurality of the notches with one of the detents and notches disposed adjacent one end of the connector and the other one of the detents and notches disposed adjacent an opposite end of the connector.

11. The handheld electronic device according to claim 7 wherein each strip is comprised of one end that is disposed in contact with one of the contacts of the first plurality of electrical contacts, a portion that is fixed to the connector, and another end that is disposed in contact with one of the contacts of the second plurality of electrical contacts.

12. The handheld electronic device according to claim 11 wherein each strip is generally U-shaped and has both ends comprised of an elastic metal that tends to urge each end away from the connector such that each end keeps a certain distance from the connector.

13. The handheld electronic device according to claim 11 wherein the first plurality of electrical contacts is carried by one of the surfaces of the pack and the ends of the strips of the connector that contact the first plurality of contacts are arranged to contact the first plurality of electrical contacts of the pack that engages the device.

14. The handheld electronic device according to claim 13 wherein the first plurality of electrical contacts are parallel to each other and the ends of the strips of the connector that contact the first plurality of contacts are parallel to each other.

15. The handheld electronic device according to claim 7 wherein the device further comprises a circuit, a processor, and onboard memory connected to the first digital bus and the pack further comprises a circuit, a processor, and onboard memory connected to the second digital bus.

16. The handheld electronic device according to claim 15 wherein the pack further comprises a battery that provides power to the device.

17. The handheld electronic device according to claim 7 further comprising a cavity in the device in which the pack is received, the cavity being defined by a plurality of sidewalls and a bottom wall, and having a pocket in which the connector is received.

* * * * *